(12) United States Patent
Schoeck et al.

(10) Patent No.: US 12,353,243 B2
(45) Date of Patent: Jul. 8, 2025

(54) SYSTEMS AND METHODS FOR ILLUMINATED LOGO MOVEMENT

(71) Applicant: Microsoft Technology Licensing, LLC, Redmond, WA (US)

(72) Inventors: Kaitlyn Marley Schoeck, Seattle, WA (US); Robyn Rebecca Reed McLaughlin, Seattle, WA (US); Casey Cook Zelig, Seattle, WA (US); Siyuan Ma, Seattle, WA (US); Sang Ho Yoon, Redmond, WA (US); Shantanu Yadunath Thakurdesai, Denton, TX (US); James David Holberry, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 464 days.

(21) Appl. No.: 17/782,538

(22) PCT Filed: Dec. 4, 2020

(86) PCT No.: PCT/US2020/063330
§ 371 (c)(1),
(2) Date: Jun. 3, 2022

(87) PCT Pub. No.: WO2021/113649
PCT Pub. Date: Jun. 10, 2021

(65) Prior Publication Data
US 2023/0033752 A1    Feb. 2, 2023

(30) Foreign Application Priority Data
Dec. 4, 2019 (NL) ...................................... 2024378

(51) Int. Cl.
*G06F 1/16* (2006.01)

(52) U.S. Cl.
CPC .......... *G06F 1/1616* (2013.01); *G06F 1/1677* (2013.01)

(58) Field of Classification Search
CPC ..... G06F 1/1616; G06F 1/1677; G06F 1/1615
See application file for complete search history.

(56) References Cited

U.S. PATENT DOCUMENTS

| 6,494,593 B2 | 12/2002 | An et al. |
| 6,874,903 B2 | 4/2005 | Yang et al. |

(Continued)

FOREIGN PATENT DOCUMENTS

| CN | 1928663 A | 3/2007 |
| CN | 204442446 U | 7/2015 |

(Continued)

OTHER PUBLICATIONS

"Search Report and Written Opinion Issued in Netherlands Patent Application No. N2024378", Mailed Date: Sep. 16, 2020, 11 Pages.

(Continued)

*Primary Examiner* — Elmito Breval
(74) *Attorney, Agent, or Firm* — RAY QUINNEY & NEBEKER P.C.; Paul N. Taylor (57) ABSTRACT

A method of selectively illuminating part of an electronic device includes obtaining a posture status of a hinge supporting a display cover relative to a base of the electronic device and illuminating an optical module positioned on an outer surface of the electronic device based on the hinge position of the posture status.

20 Claims, 6 Drawing Sheets

(56) References Cited

U.S. PATENT DOCUMENTS

| | | |
|---|---|---|
| 7,583,353 B2 | 9/2009 | Kujiraoka |
| 7,679,893 B2 | 3/2010 | Lam et al. |
| 7,778,015 B2 | 8/2010 | Weber et al. |
| 7,824,078 B2 | 11/2010 | Peng et al. |
| 8,240,903 B2 | 8/2012 | Wu et al. |
| 9,201,452 B2 | 12/2015 | Qi et al. |
| 9,541,959 B1 | 1/2017 | Sfarzo et al. |
| 10,788,908 B2 * | 9/2020 | Jung .................... H04M 1/0283 |
| 2003/0112589 A1 | 6/2003 | Shimano et al. |
| 2009/0129006 A1* | 5/2009 | Dai ...................... G11B 33/025 345/204 |
| 2009/0190358 A1 | 7/2009 | Tye et al. |
| 2010/0238667 A1 | 9/2010 | Wu et al. |
| 2011/0043370 A1 | 2/2011 | Vahabzadeh et al. |
| 2012/0206488 A1 | 8/2012 | Wong et al. |
| 2015/0244940 A1 | 8/2015 | Lombardi et al. |
| 2016/0012797 A1 | 1/2016 | Lee |
| 2016/0274853 A1 | 9/2016 | Kozaczuk et al. |
| 2017/0123748 A1* | 5/2017 | Kim ....................... G06F 1/1677 |
| 2017/0322368 A1 | 11/2017 | Seo et al. |

FOREIGN PATENT DOCUMENTS

| | | |
|---|---|---|
| CN | 106104663 A | 11/2019 |
| CN | 106462211 A | 4/2020 |
| WO | 2017204917 A2 | 11/2017 |

OTHER PUBLICATIONS

"International Search Report and Written Opinion Issued in PCT Application No. PCT/US20/063330", Mailed Date: Mar. 1, 2021, 12 Pages.

Office Action received for Chinese Application No. 202080084723.8, mailed on Dec. 11, 2023, 11 pages (English Translation Included).

Second Office Action Received for Chinese Application No. 202080084723.8, mailed on Aug. 7, 2024, 12 pages (English Translation Provided).

Third Office Action Received for Chinese Application No. 202080084723.8, mailed on Oct. 22, 2024, 08 pages. (English Translation Provided).

Notice of Allowance Received for Chinese Application No. 202080084723.8, mailed on Jan. 28, 2025, 05 pages. (English Translation Provided).

Communication pursuant to Article 94(3) Received for European Application No. 20828816.7, mailed on May 6, 2025, 07 pages.

* cited by examiner

SYSTEMS AND METHODS FOR ILLUMINATED LOGO MOVEMENT

BACKGROUND

Background and Relevant Art

Wireless electronic devices provide users improved levels of freedom while remaining connected to personal and professional communications. Conventional folding laptop devices support a display with a base portion containing a keyboard. The form factor requires a base to support the display and limits the options for positions and postures of an electronic device.

Portable electronic devices with hinges or selectively removable connections that allow a greater variety of positions and postures provide a user with a more freedom in utilizing the electronic device in different applications throughout their day.

BRIEF SUMMARY

In some embodiments, a portable electronic device includes a plurality of optical modules positioned in a housing or support of the electronic device body. In some postures or positions of the electronic device, at least one of the optical modules is obscured by another portion of the electronic device. In some embodiments, the portions of the electronic device body are connected and supported relative to one another by a hinge. In some embodiments, the portable electronic device illuminates one or more of the optical modules based upon a posture status of the hinge. The portable electronic device uses the posture status to dynamically change the illuminated optical modules to keep a visible optical modules during posture changes.

In some embodiments, a method of selectively illuminating part of an electronic device includes obtaining a posture status of a hinge supporting a display cover relative to a base of the electronic device and illuminating an optical module positioned on an outer surface of the electronic device based on the hinge position of the posture status.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 2-1 is a rear perspective view of an electronic device with an illuminated optical module, according to at least one embodiment of the present disclosure;

FIG. 2-2 is a rear perspective view of the electronic device of FIG. 2-1 with the optical module darkened, according to at least one embodiment of the present disclosure;

FIG. 5-1 is a perspective view of an optical module, according to at least one embodiment of the present disclosure;

FIG. 5-2 is a perspective view of an optical module with a mask thereon, according to at least one embodiment of the present disclosure;

FIG. 5-3 is a perspective view of an optical module with a transmissive material covering the optical module, according to at least one embodiment of the present disclosure;

DETAILED DESCRIPTION

The present disclosure relates generally to systems and methods for illuminating an optical module on an electronic device. More particularly, the present disclosure relates to illuminating one or more optical modules on an outer surface of an electronic device based on the posture status of a hinge of the electronic device. In some embodiments, the posture status includes a hinge position. In some embodiments, the posture status includes the hinge position and an orientation of the electronic device. Some portable electronic devices include an illuminated logo integrated into the housing that is illuminated when the electronic device is powered on and/or being used. In some positions and/or postures, the illuminated logo is obscured by another portion of the electronic device.

The optical module includes a light source that illuminates the optical module when a current is applied to the light source. The electronic device may selectively illuminate an optical module based on the posture status of the electronic device. In some embodiments, the optical module is a thin optical module that does not add significant thickness to the housing of the electronic device. The thinness of the optical module may allow the optical module or a plurality of optical modules to be positioned on the outer surface of the electronic device. The electronic device may illuminate one or more optical modules based on the portions of the outer surface that are visible in the current posture of the electronic device. In some embodiments, the electronic device illuminates one of the optical modules at a time, changing the location of the illuminated optical module based on the posture of the electronic device. In some embodiments, the electronic device illuminates more than one of the plurality of the optical modules at a time, changing the locations of the illuminated optical modules based on the posture of the electronic device. In at least one embodiment, the electronic device illuminates one optical module at a time with a transition period during which more than one of the optical modules are illuminated simultaneously.

Figure 1:
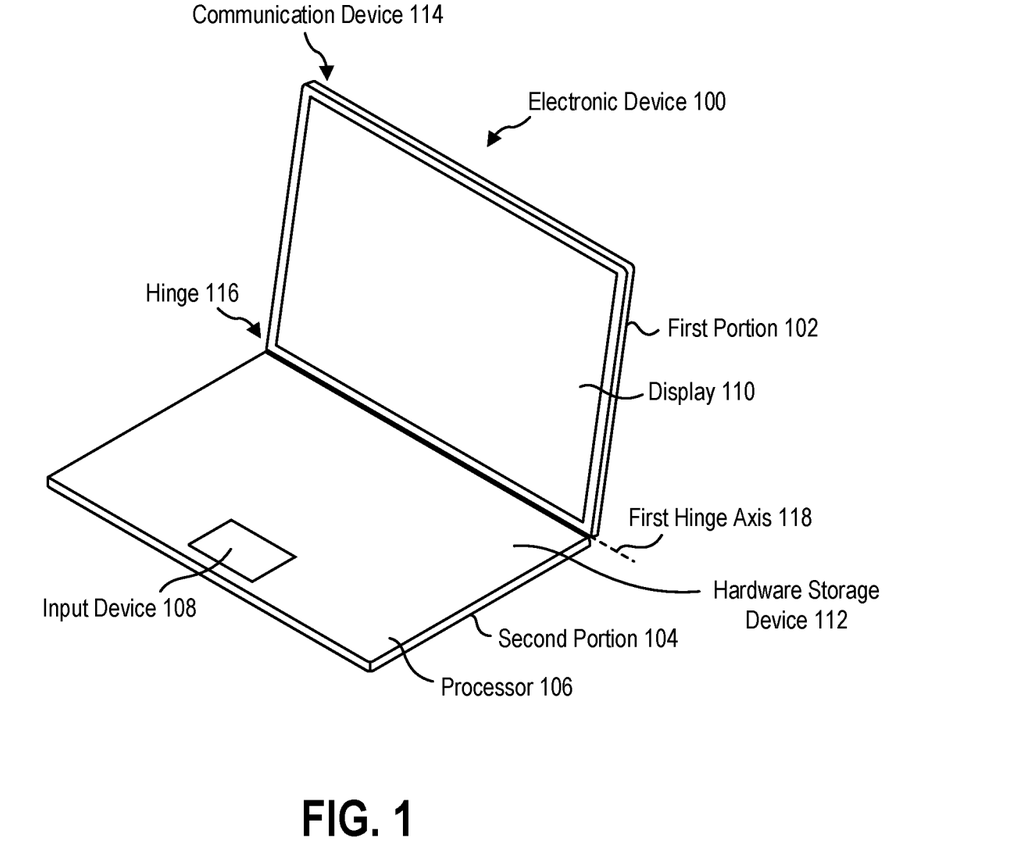
FIG. 1 is a perspective view of an electronic device, according to at least one embodiment of the present disclosure.

FIG. 1 is a perspective view of an embodiment of an electronic device according to the present disclosure. In some embodiments, the electronic device 100 has a first portion 102 and second portion 104 that are movably connected to one another. The electronic device 100 includes various components located in or one the portions of the electronic device 100 that are in data communication through one or more buses and interfaces. Examples of components include a processor(s) 106, input device(s) 108, display(s) 110, hardware storage device(s) 112, communication device(s) 114, and other components.

In some embodiments, the processor(s) 106 is a central processing unit (CPU) that performs general computing tasks for the electronic device 100. In some embodiments, the processor(s) 106 is or is part of a system on chip (SoC) that is dedicated to controlling or communicating with one or more subsystems of the electronic device 100.

In some embodiments, the input device(s) 108 is a mouse, a stylus, a trackpad, a touch-sensitive device, a touch-sensitive display, a keyboard, or other input human-interface device. In some embodiments, the display(s) 110 is a liquid crystal display (LCD), a light emitting diode (LED) display, a thin film transistor (TFT) display, or other display. In some embodiments, the display 110 is integrated into the electronic device 100, such as illustrated in the embodiment of FIG. 1.

In some embodiments, the hardware storage device(s) 112 is a non-transient storage device including any of RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

In some embodiments, an electronic device has a plurality of potential postures in which a user may use the electronic device. In some embodiments, the electronic device has a laptop posture in which a first portion is supported by a hinge connecting the first portion to a second portion around a first hinge axis. In at least one embodiment, the first portion is a display cover that contains and supports a display of the electronic device, and the second portion is a base that contains at least one input device of the electronic device. The laptop posture positions the display facing a user in a conventional laptop configuration. In the laptop posture, a first optical module positioned on the outer surface of the first portion (e.g., the display cover) may be visible and illuminated.

Figure 21:
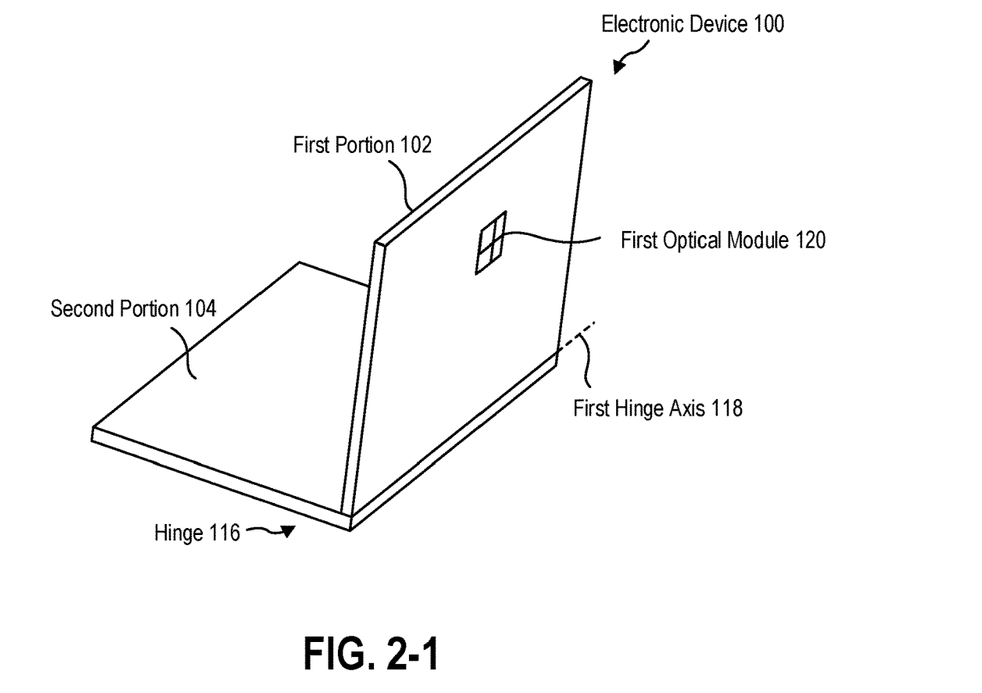

The electronic device 100 illustrated in FIG. 1 and FIG. 2-1 is illustrated in a laptop posture with the first portion 102 supported by a hinge 116 relative to a second portion 104 at an angular position around a first hinge axis 118. The hinge 116 allows for friction around the first hinge axis 118 to support the first portion in a variety of positions and angles while the first optical module 120 is visible. As the first optical module 120 is visible in the laptop configuration, the electronic device 100 illuminates the first optical module 120 projecting a lighted logo or other symbol form the first portion 102.

Figure 22:
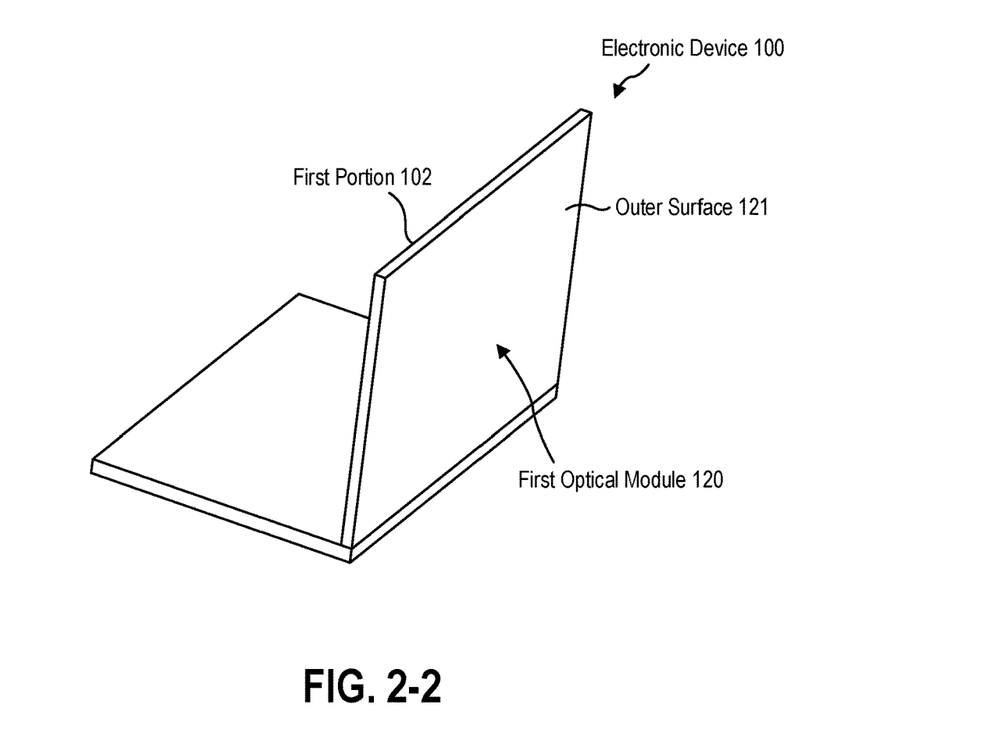

FIG. 2-2 illustrates an example of the embodiment of the electronic device 100 of FIG. 1 and FIG. 2-1 in which the first optical module 120 has been darkened by the electronic device 100. In some embodiments, the first optical module 120 is positioned on an outer surface 121 of the first portion 102 but is layered underneath a transmissive material. The transmissive material obscures the first optical module 120 when the first optical module 120 is darkened, but the transmissive material allows light to be emitted through the transmissive material when the optical module is illuminated.

In some embodiments, the electronic device includes a processor in data communication with other components of the electronic device, including but not limited to the input device(s), the display, a hardware storage device, a power supply, the optical module(s), one or more posture and/or orientation sensors, a communication device, or other electronic components.

The electronic device has other postures other than a laptop posture including a studio or drafting posture in which the first portion is supported by a third portion, such as a support, connecting the first portion to the second portion. The third portion is connected to the second portion around the first hinge axis, and the third portion is connected to the first portion around a second hinge axis. In some embodiments, the third portion rotating around the first hinge axis allows the first portion to move longitudinally relative to the second portion. For example, the first portion with a display therein may be positioned over the second portion and closer to the user to facilitate drafting on a touch-sensitive display.

Figure 3:
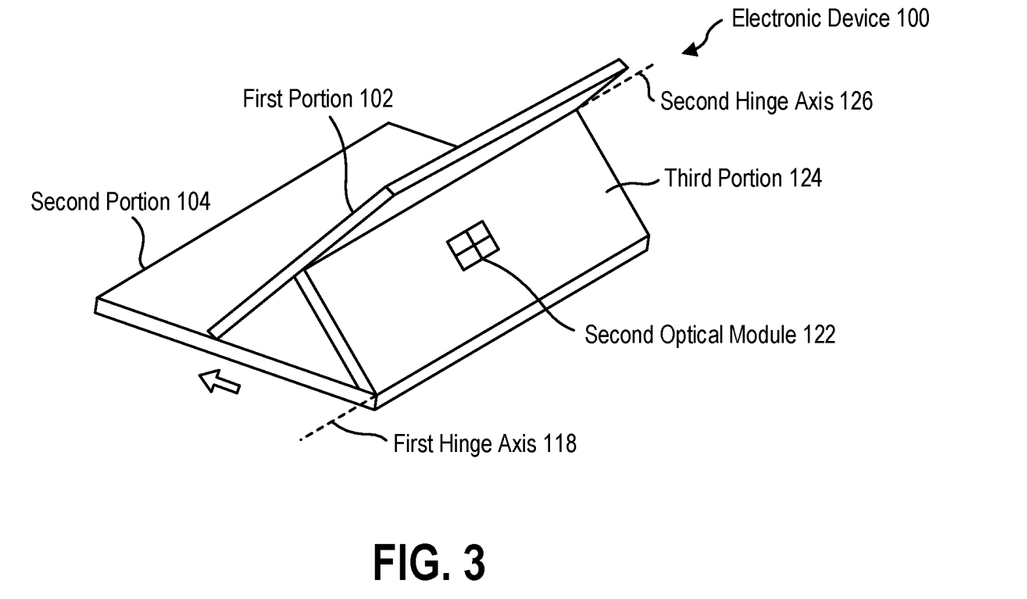
FIG. 3 is a rear perspective view of an electronic device with an illuminated second optical module, according to at least one embodiment of the present disclosure.

As shown in FIG. 3, in the drafting posture, the first optical module (e.g., 120 of FIG. 2-1) that is illuminated in the laptop posture may be obscured or oriented downward, limiting the visibility of the first optical module. As the first portion 102 is moved over the second portion 104 by the third portion 124, a second optical module 122 positioned on the third portion 124 (e.g., the support) may be illuminated when the hinge position around the first hinge axis 118 and/or second hinge axis 126 that indicates that electronic device 100 is in the drafting posture. In some embodiments, the second optical module 122 is then able to shine upward and outward from the electronic device in a direction opposite the user. In some embodiments, the second optical module 122 and first optical module (e.g., 120 of FIG. 2-1) are both covered by a transmissive material on the outer surface of the first portion 102 and third portion 124 such that both the second optical module 122 and first optical module are only visible when illuminated. In some embodiments, the transmissive material is continuous between the first portion 102 and the third portion 124 (e.g., a single continuous sheet of transmissive material that bridges the second hinge axis 126). In such embodiments, when the electronic device 100 is in the laptop posture, as shown in FIG. 2-1, the first optical module 120 is illuminated and the second optical module 122 is not visible and the outer surface 121 has a continuous appearance, while in the drafting posture shown in FIG. 3, the first optical module is not visible and the second optical module 122 is illuminated on the third portion 124.

In some embodiments, a hinge position is measured by a sensor located in the hinge at or near the first hinge axis 118 or second hinge axis 126. For example, the hinge may include a Hall effect sensor in which the magnetic force measured by the sensor changes with rotation around the hinge axis 118, 126, a potentiometer in which the electric potential measured by the sensor changes with rotation around the hinge axis 118, 126, a contact array positioned around the hinge axis 118, 126 to measure the position of the first portion 102 relative to the third portion 124 or the third portion 124 relative to the second portion 104, or other rotational position or movement sensors.

In some embodiments, the hinge position is measured by a sensor located outside of the hinge and away from the first hinge axis 118 or second hinge axis 126. For example, the electronic device 100 may include an infrared optical sensor that measures a location of the first portion 102 relative to the second portion 104. In other examples, the second portion 104 may contain a Hall effect sensor therein that detects a position of a lower edge of the first portion 102 relative to the second portion 104, thereby indirectly measuring the necessary rotational positions of the first hinge axis 118 and second hinge axis 126.

Figure 4:
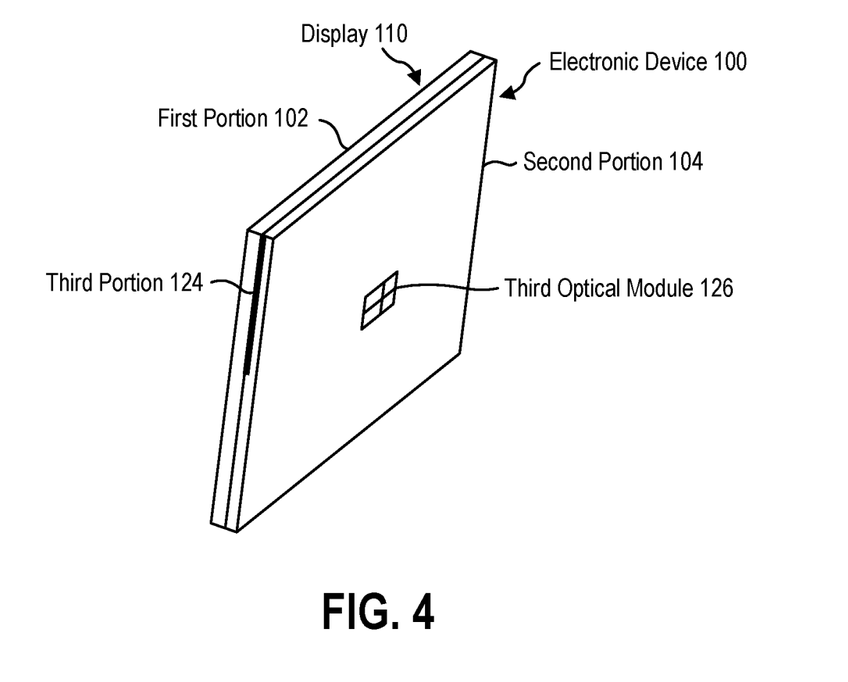
FIG. 4 is a bottom perspective view of an electronic device with an illuminated third optical module, according to at least one embodiment of the present disclosure.

FIG. 4 is a perspective view of the electronic device 100 further positioned in a tablet posture with the first portion 102 inverted with the display 110 oriented away from the second portion 104. For example, the outer surface 121 of the first portion 102 may be oriented toward the second portion 104 and the third portion 124 while the first optical module and second optical module are obscured and not visible. In such embodiments, the electronic device illuminates a third optical module 128 positioned on the outer surface of the second portion 104 opposite the first portion 102 and the third portion 124. In other words, the third optical module 128 may be positioned on a bottom surface of the base, such that when a user is viewing and/or interacting with the display 110, the third optical module 128 may be illuminated and visible on a surface opposite the display 110.

The optical module, itself, includes a transparent element that allows for the transmission of light. The transparent element may guide light from a light source through the transparent element and emit the light to provide an appearance of substantially uniform emission from the optical module. In some embodiments, the visible illumination of the optical module from the transparent element out of the surface of the electronic device is uniform within 10% variation. In some embodiments, the visible illumination of the optical module from the transparent element out of the surface of the electronic device is uniform within 5% variation. In some embodiments, the visible illumination of the optical module from the transparent element out of the surface of the electronic device is uniform within 2% variation.

Figure 51:
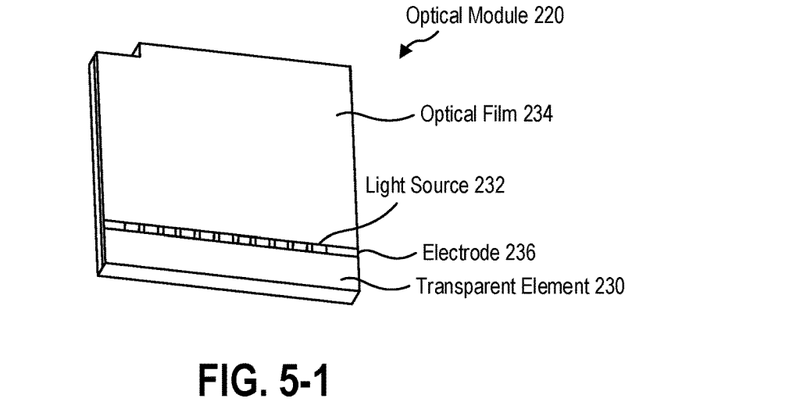
Figure 52:
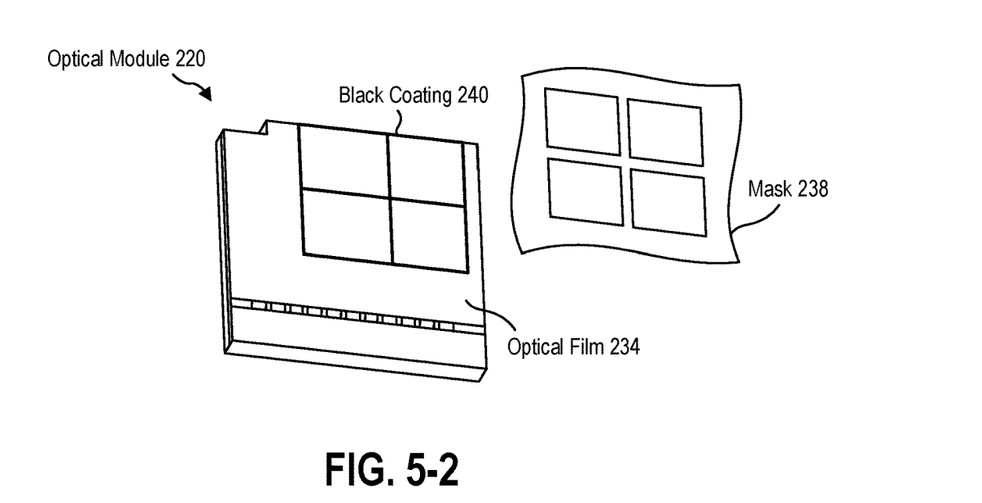
Figure 53:
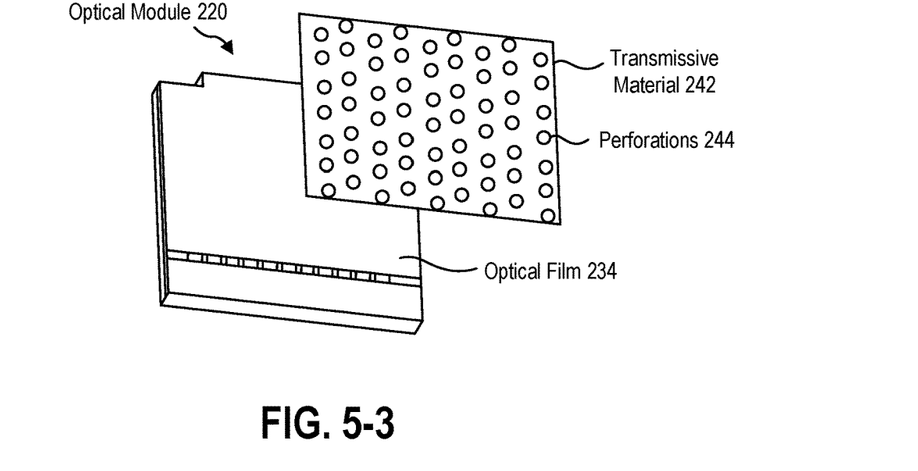

FIG. 5-1 through 5-3 illustrate an embodiment of an optical module according to the present disclosure with different coverings. FIG. 5-1 is a perspective view of an embodiment of an optical module 220 that includes a transparent element 230, a light source 232 or an array of light sources positioned to edge-light the transparent element 230, an optical film 234 positioned over a portion of the transparent element 230 out of which the light from the light source 232 will exit the optical module 220, and an electrode to provide power to the light source 232. In some embodiments, edge lighting the transparent element 230 with the light source 232 allows the optical module 220 to have a smaller thickness in a direction normal to the surface of the transparent element 230.

In some embodiments, the transparent element of the optical module is an acrylic. In some embodiments, the transparent element of the optical module is another polymer. In some embodiments, the transparent element of the optical module is glass.

The transparent element may be illuminated by a light source positioned adjacent the transparent element to edge-light the transparent element. In some embodiments, the light source includes a light emitting diode (LED). In some embodiments, the light source is a plurality of LEDs. For example, the optical module may include an array of LEDs that provide white light to illuminate the transparent element. In some examples, the light source provides one or more colors of light to illuminate the transparent element.

The wavelength(s) of the light provided by the light source may be adjustable or selectable. In some embodiments, the wavelength of the light is user selectable to customize the color of the optical module to the user's preferences. For example, a software control may allow a user to select different particular LEDs within the array of LEDs to control the wavelength or range of wavelengths emitted by the array of LEDs. In some embodiments, the wavelength of the light changes based upon an operating mode of the electronic device. For example, when used in a performance or gaming electronic device, the optical module can change from a standard white light to a red wavelength when the electronic device operates in a high performance or gaming mode. In other examples, when the electronic device is operating a battery saving mode, the optical module may change to a green wavelength. In other examples, when the electronic device is charging, the optical module may change brightness (e.g., periodic pulsing) to indicate charging of the batteries.

In some embodiments, an optical film or covering is applied to at least a portion of the transparent element. In some examples, the optical film alters the wavelength of the light that exits the optical module. For example, different regions of the optical module may have different optical films that provide different transmission colors. In other examples, the optical film scatters or diffuses the light exiting the transparent element to provide a more uniform appearance to the optical module when illuminated.

As described herein, the optical modules according to the present disclosure may be thin so as to be positioned within the housing of portable electronic devices. In some embodiments, the stack of the transparent element, optical film(s), light source, and electrode upon which the light source is positioned has a total thickness normal to the plane of the optical module in a range having an upper value, a lower value, or upper and lower values including any of 0.5 millimeters (mm), 0.6 mm, 0.7 mm, 0.8 mm, 0.9 mm, 1.0 mm, 1.2 mm, 1.4 mm, 1.7 mm, 2.0 mm, or any values therebetween. For example, the thickness of the optical module may be less than 2.0 mm. In other examples, the thickness of the optical module may be less than 1.5 mm. In yet other examples, the thickness of the optical module may be between 0.5 mm and 1.5 mm. In at least one example, the thickness of the optical module is 1.2 mm. With a plurality of optical modules positioned in the housing of the electronic device, a thin optical module may allow the placement of the optical module in more locations within the electronic device even when nearly all interior space is used in thin and/or light electronic devices.

When the optical module is positioned behind a mask or other opaque material of the electronic device housing, the underside of the mask can create optical artifacts visible in the optical module. For example, the edges of the mask may be visible in a reflection on the back surface of the transparent element. In some embodiments, the reflections and other optical artifacts are reduced by the application of a non-reflective coating or paint at or near the edges of the mask.

FIG. 5-2 is a perspective view of the optical module 220 of FIG. 5-1, with a mask 238 positioned over the optical film 234. Because the mask 238 may, itself, be reflective, a repeated reflection within the transparent element can be reduced or prevented by application of black or other nonreflective coatings 240 positioned between the mask 238 and the optical film 234. In some embodiments, the black coating 240 is applied to the optical film 234. In some embodiments, the black coating 240 is applied to the mask 238.

In some embodiments, the optical module is obscured being a transmissive material. The transmissive material allows the light from the optical module to pass through and be visible to a user when the optical module is illuminated, but the transmissive material hides the optical module when the optical module is not illuminated. In this way, the optical module can selectively appear on the outer surface of the electronic device when illuminated or appear to move when the first optical module is darkened and a different optical module is illuminated.

In some embodiments, the transmissive material is transmissive textile, such as a woven organic or synthetic fiber. In some examples, the textile is wool, cotton, polyester, nylon, or other fiber. In some embodiments, the transmissive material is a perforated material. In some examples, the perforated material allows light from the optical module through the perforations and is otherwise opaque to obscure the optical module when darkened. The perforated material may be leather, a polymer, vinyl, metal, or other continuous material. In at least one example, the transmissive material is part of the housing of the electronic device, such as a perforated region of an aluminum housing. In at least another example, the transmissive material is a discrete layer applied to the housing of the electronic device, such as a transmissive textile or a perforated leather applied to an aluminum housing.

FIG. 5-3 is a perspective view of the optical module 220 with a transmissive material positioned above the optical film 234. While the figure illustrates the transmissive material 242 positioned spaced apart from the optical film 234, in some embodiments, the transmissive material 242 may be adhered directly to the optical film 234. As described herein, the transmissive material 242 may be a porous or non-continuous sheet of material that allows a portion of incident light to transmit through. In some embodiments, the transmissive material 242 is a substantially opaque material, such as leather, a polymer (e.g., ABS), or a metal that includes a plurality of perforations 244. In some embodiments, the transmissive material 242 is the mask 238, described in relation to FIG. 5-2, and the positions, sizes, and arrangements of the perforations generate an image. In some embodiments, the transmissive material 242 is used with a discrete mask 238, and the positions, sizes, and arrangements of the perforations are substantially uniform so as to not interfere with the image generated by the mask 238.

Figure 6:
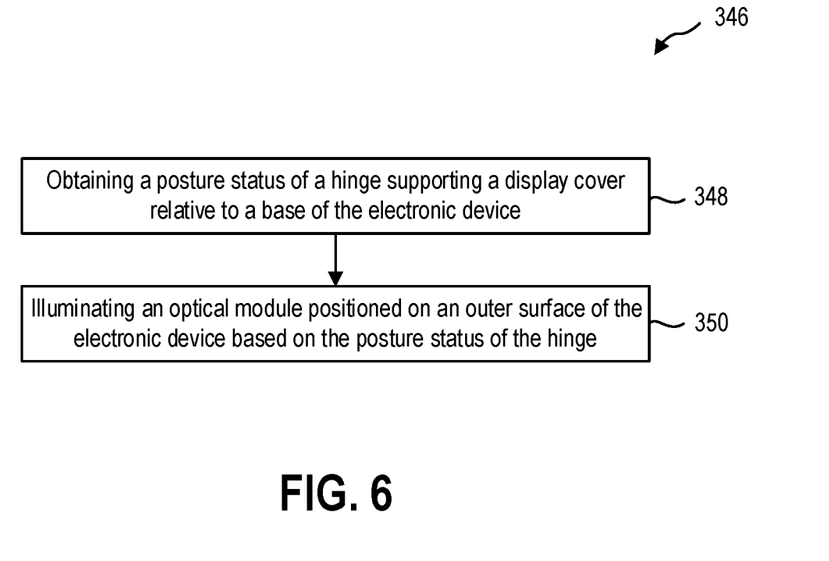
FIG. 6 is a flowchart illustrating a method of illuminating an optical module on an outer surface of an electronic device based on hinge position, according to at least one embodiment of the present disclosure.

FIG. 6 illustrates an embodiment of a method of controlling optical modules in an electronic device. In some embodiments, a method 346 of controlling the illumination of optical modules in an electronic device includes obtaining (348) a posture status of a hinge of the electronic device. The posture status of the hinge supporting a display cover relative to a base of the electronic device indicates the position of the display cover (e.g., the first portion) relative to the base (e.g., the second portion). By measuring, receiving, or otherwise obtaining the hinge position, the electronic device can determine whether or not a first optical module is visible by a user or by other individuals in the user's environment.

The method further includes illuminating (350) an optical module positioned on an outer surface of the electronic device based on the posture status of the hinge. For example, when a first hinge axis is positioned between 5° and 150° and a second hinge axis is positioned at 0° (e.g., is closed), a first optical module is illuminated, and when the first hinge axis is positioned outside of 5° to 150° or a second hinge axis is not positioned at 0°, the first optical module is darkened. In another example, when a sum of the angular position of the first hinge axis and the second hinge axis is between 5° and 150°, the first optical module is illuminated, and when the sum of the angular position of the first hinge axis and the second hinge axis is less than 5° or greater than 150°, the first optical module is illuminated.

Figure 7:
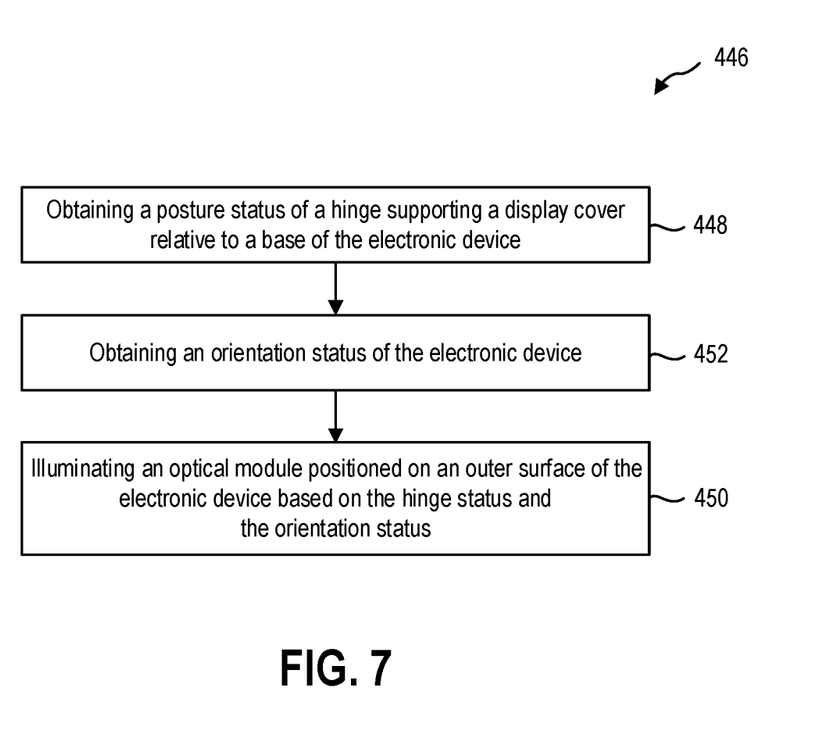
FIG. 7 is a flowchart illustrating a method of illuminating an optical module on an outer surface of an electronic device based on hinge position and device orientation, according to at least one embodiment of the present disclosure.

As shown in the flowchart of FIG. 7, in some embodiments, the method 446 further includes obtaining (448) a posture status of a hinge of the electronic device and obtaining (452) an orientation status of the electronic device as part of the posture status. For example, an accelerometer, gyroscope, or other orientation sensor may provide an orientation status that indicates whether a user has picked up or tilted the electronic device. In some examples, an optical module is positioned on a bottom surface of the base of the electronic device. The optical module on the bottom surface may be illuminated when both the hinge position indicates the device is in the tablet posture and the orientation status indicates the user has picked up the electronic device and the electronic device is not oriented horizontally on a work surface. In other examples, a first optical module on an outer surface of the first portion and a second optical module on the bottom surface may be both illuminated when the hinge position indicates the device is in the laptop posture and the orientation status indicates the user has rotated the electronic device to a book-like orientation (e.g., with the hinge axis oriented vertically. By selectively illuminating (450) an optical module based on a combination of a hinge position and an orientation of the electronic device, the electronic device can prevent illuminating an obscured or not visible optical module and thereby reduce energy consumption and heat generation.

Figure 8:
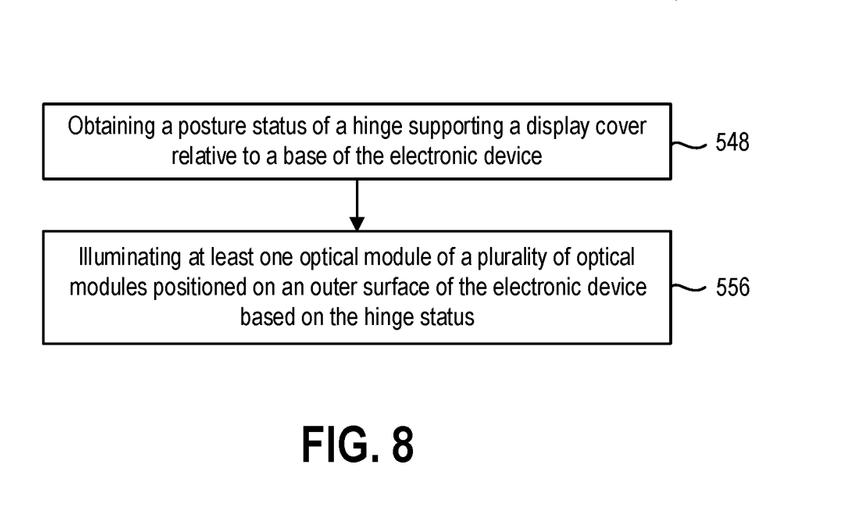
FIG. 8 is a flowchart illustrating a method of illuminating one of a plurality of optical modules on an outer surface of an electronic device based on posture status, according to at least one embodiment of the present disclosure.

In some embodiments, another method 554 of controlling the illumination of optical modules in an electronic device includes obtaining (548) a posture state of a hinge supporting a display cover relative to a base of the electronic device, and then selectively illuminating (556) one or more of a plurality of optical modules, as shown in the flowchart of FIG. 8. A plurality of optical modules can allow the electronic device to selectively illuminate an optical module that is visible in the current posture and/or orientation of the electronic device. For example, a first optical module positioned on an outer surface of a display cover (e.g., a first portion) is visible to individuals in the user's surrounding environment when the electronic device is in a laptop posture, a second optical module positioned on an outer surface of a support (e.g., a third portion) is visible to individuals in the user's surrounding environment when the electronic device is in a drafting or studio posture, and a third optical module positioned on an outer surface of a base (e.g., a second portion) is visible to individuals in the user's surrounding environment when the electronic device is in a tablet posture.

Illuminating or darkening an optical module may occur after a delay. For example, the optical module(s) may remain either illuminated or darkened while a user moves a first portion of the electronic device relative to a second portion, such that the electronic device waits until the posture status is constant for a period of time before illuminating or darkening the optical module(s). In other examples, the optical module(s) may remain either illuminated or darkened until the posture status indicates the electronic device is in the same posture for a period of time, even if the hinge position and/or device orientation is changing within that posture. In some embodiments, the delay is in a range having an upper value, a lower value, or upper and lower values including any of 50 milliseconds (ms), 100 ms, 200 ms, 300 ms, 400 ms, 500 ms, or any values therebetween. For example, the delay may be greater than 50 ms. In other examples, the delay is less than 500 ms. In some examples, the delay is between 50 ms and 500 ms. In at least one example, the delay is 100 ms.

The delay in illumination or darkening of the optical module may improve the user experience. For example, a delay requires the electronic device to be positioned in a particular posture and/or orientation for a period of time before the optical module is illuminated or darkened. In the absence of a delay period, moving the electronic device from the tablet posture (illustrated in FIG. 4) through the drafting posture (illustrated in FIG. 3) through the laptop posture (illustrated in FIG. 2) to a closed posture would result in a rapid succession of illumination and darkening of each of the optical modules 120, 122, 126. The resulting flashing of optical modules during rapid posture changes may be undesirable and a delay period allows the electronic device to pass through postures and only illuminate or darken the optical module when the changes to the posture have ceased or slowed.

In some embodiments that include illuminating a first optical module and darkening a second optical module based on the posture status, the first optical module and second optical module are concurrently illuminated. The first optical module and second optical module may be concurrently illuminated for an overlap period in a range having an upper value, a lower value, or upper and lower values including any of 100 ms, 200 ms, 300 ms, 400 ms, 500 ms, 750 ms, 1.0 seconds, or any values therebetween. For example, the overlap period may be greater than 100 ms. In other examples, the overlap period is less than 1.0 second. In some examples, the overlap period is between 100 ms and 1.0 second. In at least one example, the overlap period is 500 ms.

Some embodiments illuminate and/or darken the optical module approximately instantaneously or as quickly as the electronics allow. In some embodiments, the optical module is illuminated or darkened over a fade period. The first optical module and second optical module may be concurrently illuminated for a fade period in a range having an upper value, a lower value, or upper and lower values including any of 100 ms, 200 ms, 300 ms, 400 ms, 500 ms, 750 ms, 1.0 seconds, or any values therebetween. For example, the fade period may be greater than 100 ms. In other examples, the fade period is less than 1.0 second. In some examples, the fade period is between 100 ms and 1.0 second. In at least one example, the fade period is 500 ms.

Figure 9:
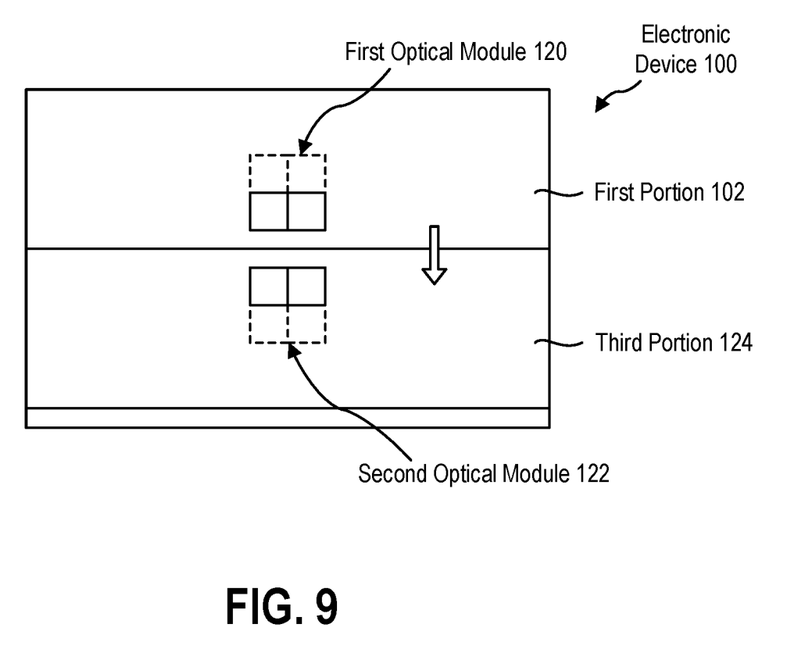
FIG. 9 is a rear view of an electronic device having a first optical module and a second optical module that are illuminated simultaneously to slide a logo between the first optical module and the second optical module.

As described herein, the light source of the optical module may include a plurality of light sources, such as a LED array. The array of light sources can allow the optical module to be illuminated or darkened from a first side to a second side by illuminating or darkening the LEDs sequentially, such as illustrated in FIG. 9. In some embodiments, sequential darkening of illuminated LEDs in a first optical module 120 in combination with sequential illumination of LEDs in a second optical module 122 provides a slide effect of the illuminated portion of the logo or other symbol from the first portion 102 downward to the second portion 104 and can provide the appearance of a logo or other illuminated symbol moving across the outer surface of the electronic device as the posture changes.

INDUSTRIAL APPLICABILITY

The present disclosure relates generally to systems and methods for illuminating an optical module on an electronic device. More particularly, the present disclosure relates to illuminating one or more optical modules on an outer surface of an electronic device based on the posture status of a hinge of the electronic device. In some embodiments, the posture status includes a hinge position. In some embodiments, the posture status includes the hinge position and an orientation of the electronic device.

The optical module includes a light source that illuminates the optical module when a current is applied to the light source. The electronic device may selectively illuminate an optical module based on the posture status of the electronic device. In some embodiments, the optical module is a thin optical module that does not add significant thickness to the housing of the electronic device. The thinness of the optical module may allow the optical module or a plurality of optical modules to be positioned on the outer surface of the electronic device. The electronic device may illuminate one or more optical modules based on the portions of the outer surface that are visible in the current posture of the electronic device. In some embodiments, the electronic device illuminates one of the optical modules at a time, changing the location of the illuminated optical module based on the posture of the electronic device. In some embodiments, the electronic device illuminates more than one of the plurality of the optical modules at a time, changing the locations of the illuminated optical modules based on the posture of the electronic device. In at least one embodiment, the electronic device illuminates one optical module at a time with a transition period during which more than one of the optical modules are illuminated simultaneously.

In some embodiments, an electronic device has a plurality of potential postures in which a user may use the electronic device. In some embodiments, the electronic device has a laptop posture in which a first portion is supported by a hinge connecting the first portion to a second portion around a first hinge axis. In at least one embodiment, the first portion is a display cover that contains and supports a display of the electronic device, and the second portion is a base that contains at least one input device of the electronic device. The laptop posture positions the display facing a user in a conventional laptop configuration. In the laptop posture, a first optical module positioned on the outer surface of the first portion (e.g., the display cover) may be visible and illuminated.

The electronic device includes a processor in data communication with other components of the electronic device, including but not limited to the input device(s), the display, a hardware storage device, a power supply, the optical module(s), one or more posture and/or orientation sensors, a communication device, or other electronic components. In some embodiments, the hardware storage device has instructions stored thereon that, when executed by the processor, cause the processor to perform any of the methods described herein.

The electronic device has other postures other than a laptop posture including a studio or drafting posture in which the first portion is supported by a third portion, such as a support, connecting the first portion to the second portion. The third portion is connected to the second portion around the first hinge axis, and the third portion is connected to the first portion around a second hinge axis. In some embodiments, the third portion rotating around the first hinge axis allows the first portion to move longitudinally relative to the second portion. For example, the first portion with a display therein may be positioned over the second portion and closer to the user to facilitate drafting on a touch-sensitive display.

In the drafting posture, the first optical module illuminated in the laptop posture may be obscured or oriented downward, limiting the visibility of the first optical module. A second optical module positioned on the third portion (e.g., the support) may be illuminated when the hinge position around the first hinge axis and/or second hinge axis the electronic device indicates that electronic device is in the drafting posture.

The electronic device may further be positioned in a tablet posture with the first portion inverted relative to the second portion. For example, the outer surface of the first portion may be oriented toward the second portion with the first optical module and second optical module obscured and not visible. In such embodiments, the electronic device illuminates a third optical module positioned on the outer surface of the second portion opposite the first portion and the third portion. In other words, the third optical module may be positioned on a bottom surface of the base, such that when a user is viewing and/or interacting with the display, the third optical module may be illuminated and visible on a surface opposite the display.

The optical module includes a transparent element that allows for the transmission of light. The transparent element may guide light from a light source through the transparent element and emit the light to provide an appearance of substantially uniform emission from the optical module. In some embodiments, the visible illumination of the optical module from the transparent element out of the surface of the electronic device is uniform within 10% variation. In some embodiments, the visible illumination of the optical module from the transparent element out of the surface of the electronic device is uniform within 5% variation. In some embodiments, the visible illumination of the optical module from the transparent element out of the surface of the electronic device is uniform within 2% variation.

In some embodiments, the transparent element of the optical module is an acrylic. In some embodiments, the transparent element of the optical module is another polymer. In some embodiments, the transparent element of the optical module is glass.

The transparent element may be illuminated by a light source positioned adjacent the transparent element to edge-light the transparent element. In some embodiments, the light source includes a light emitting diode (LED). In some embodiments, the light source is a plurality of LEDs. For example, the optical module may include an array of LEDs that provide white light to illuminate the transparent element. In some examples, the light source provides one or more colors of light to illuminate the transparent element.

The wavelength(s) of the light provided by the light source may be adjustable or selectable. In some embodiments, the wavelength of the light is user selectable to customize the color of the optical module to the user's preferences. In some embodiments, the wavelength of the light changes based upon an operating mode of the electronic device. For example, when used in a performance or gaming electronic device, the optical module can change from a standard white light to a red wavelength when the electronic device operates in a high performance or gaming mode. In other examples, when the electronic device is operating a battery saving mode, the optical module may change to a green wavelength. In other examples, when the electronic device is charging, the optical module may change brightness (e.g., periodic pulsing) to indicate charging of the batteries.

In some embodiments, an optical film or covering is applied to the transparent element. In some examples, the optical film alters the wavelength of the light that exits the optical module. In other examples, the optical film scatters or diffuses the light exiting the transparent element to provide a more uniform appearance to the optical module when illuminated.

As described herein, the optical modules according to the present disclosure may be thin so as to be positioned within the housing of portable electronic devices. In some embodiments, the stack of the transparent element, optical film(s), light source, and electrode upon which the light source is positioned has a total thickness normal to the plane of the optical module in a range having an upper value, a lower value, or upper and lower values including any of 0.5 millimeters (mm), 0.6 mm, 0.7 mm, 0.8 mm, 0.9 mm, 1.0 mm, 1.2 mm, 1.4 mm, 1.7 mm, 2.0 mm, or any values therebetween. For example, the thickness of the optical module may be less than 2.0 mm. In other examples, the thickness of the optical module may be less than 1.5 mm. In yet other examples, the thickness of the optical module may be between 0.5 mm and 1.5 mm. In at least one example, the thickness of the optical module is 1.2 mm.

When the optical module is positioned behind a mask or other opaque material of the electronic device housing, the underside of the mask can create optical artifacts visible in the optical module. For example, the edges of the mask may be visible in a reflection on the back surface of the transparent element. In some embodiments, the reflections and other optical artifacts are reduced by the application of a non-reflective coating or paint at or near the edges of the mask.

In some embodiments, the optical module is obscured being a transmissive material. The transmissive material allows the light from the optical module to pass through and be visible to a user when the optical module is illuminated, but the transmissive material hides the optical module when the optical module is not illuminated. In this way, the optical module can selectively appear on the outer surface of the electronic device when illuminated or appear to move when the first optical module is darkened and a different optical module is illuminated.

In some embodiments, the transmissive material is transmissive textile, such as a woven organic or synthetic fiber. In some examples, the textile is wool, cotton, polyester, nylon, or other fiber. In some embodiments, the transmissive material is a perforated material. In some examples, the perforated material allows light from the optical module through the perforations and is otherwise opaque to obscure the optical module when darkened. The perforated material may be leather, a polymer, vinyl, metal, or other continuous material. In at least one example, the transmissive material is part of the housing of the electronic device, such as a perforated region of an aluminum housing. In at least another example, the transmissive material is a discrete layer applied to the housing of the electronic device, such as a transmissive textile or a perforated leather applied to an aluminum housing.

In some embodiments, a method of controlling the illumination of optical modules in an electronic device includes obtaining a posture status of a hinge of the electronic device. The posture status of the hinge supporting a display cover relative to a base of the electronic device indicates the position of the display cover (e.g., the first portion) relative to the base (e.g., the second portion). By measuring, receiving, or otherwise obtaining the hinge position, the electronic device can determine whether or not a first optical module is visible by a user or by other individuals in the user's environment.

The method further includes illuminating an optical module positioned on an outer surface of the electronic device based on the posture status of the hinge. For example, when a first hinge axis is positioned between 5° and 150° and a second hinge axis is positioned at 0° (e.g., is closed), a first optical module is illuminated, and when the first hinge axis is positioned outside of 5° to 150° or a second hinge axis is not positioned at 0°, the first optical module is darkened. In another example, when a sum of the angular position of the first hinge axis and the second hinge axis is between 5° and 150°, the first optical module is illuminated, and when the sum of the angular position of the first hinge axis and the second hinge axis is less than 5° or greater than 150°, the first optical module is illuminated.

In some embodiments, the method further includes obtaining an orientation status of the electronic device as part of the posture status. For example, an accelerometer, gyroscope, or other orientation sensor may provide an orientation status that indicates whether a user has picked up or tilted the electronic device. In some examples, an optical module is positioned on a bottom surface of the base of the electronic device. The optical module on the bottom surface may be illuminated when both the hinge position indicates the device is in the tablet posture and the orientation status indicates the user has picked up the electronic device and the electronic device is not oriented horizontally on a work surface. In other examples, a first optical module on an outer surface of the first portion and a second optical module on the bottom surface may be both illuminated when the hinge position indicates the device is in the laptop posture and the orientation status indicates the user has rotated the electronic device to a book-like orientation (e.g., with the hinge axis oriented vertically. By selectively illuminating an optical module based on a combination of a hinge position and an orientation of the electronic device, the electronic device can prevent illuminating an obscured or not visible optical module and thereby reduce energy consumption and heat generation.

In some embodiments, a hinge position is measured by a sensor located in the hinge at or near the first hinge axis or second hinge axis. For example, the hinge may include a Hall effect sensor in which the magnetic force measured by the sensor changes with rotation around the hinge axis, a potentiometer in which the electric potential measured by the sensor changes with rotation around the hinge axis, a contact array positioned around the hinge axis to measure the position of the first portion relative to the third portion or the third portion relative to the second portion, or other rotational position or movement sensors.

In some embodiments, a method of controlling the illumination of optical modules in an electronic device includes selectively illuminating one or more of a plurality of optical modules. A plurality of optical modules can allow the electronic device to selectively illuminate an optical module that is visible in the current posture and/or orientation of the electronic device. For example, a first optical module positioned on an outer surface of a display cover (e.g., a first portion) is visible to individuals in the user's surrounding environment when the electronic device is in a laptop posture, a second optical module positioned on an outer surface of a support (e.g., a third portion) is visible to individuals in the user's surrounding environment when the electronic device is in a drafting or studio posture, and a third optical module positioned on an outer surface of a base (e.g., a second portion) is visible to individuals in the user's surrounding environment when the electronic device is in a tablet posture.

Illuminating or darkening an optical module may occur after a delay. For example, the optical module(s) may remain either illuminated or darkened while a user moves a first portion of the electronic device relative to a second portion, such that the electronic device waits until the posture status is constant for a period of time before illuminating or darkening the optical module(s). In other examples, the optical module(s) may remain either illuminated or darkened until the posture status indicates the electronic device is in the same posture for a period of time, even if the hinge position and/or device orientation is changing within that posture. In some embodiments, the delay is in a range having an upper value, a lower value, or upper and lower values including any of 50 milliseconds (ms), 100 ms, 200 ms, 300 ms, 400 ms, 500 ms, or any values therebetween. For example, the delay may be greater than 50 ms. In other examples, the delay is less than 500 ms. In some examples, the delay is between 50 ms and 500 ms. In at least one example, the delay is 100 ms.

The delay in illumination or darkening of the optical module may improve the user experience. For example, a delay requires the electronic device to be positioned in a particular posture and/or orientation for a period of time before the optical module is illuminated or darkened. In the absence of a delay period, moving the electronic device from the tablet posture (illustrated in FIG. 4) through the drafting posture (illustrated in FIG. 3) through the laptop posture (illustrated in FIG. 2) to a closed posture would result in a rapid succession of illumination and darkening of each of the optical modules 120, 122, 126. The resulting flashing of optical modules during rapid posture changes may be undesirable and a delay period allows the electronic device to pass through postures and only illuminate or darken the optical module when the changes to the posture have ceased or slowed.

In some embodiments that include illuminating a first optical module and darkening a second optical module based on the posture status, the first optical module and second optical module are concurrently illuminated. The first optical module and second optical module may be concurrently illuminated for an overlap period in a range having an upper value, a lower value, or upper and lower values including any of 100 ms, 200 ms, 300 ms, 400 ms, 500 ms, 750 ms, 1.0 seconds, or any values therebetween. For example, the overlap period may be greater than 100 ms. In other examples, the overlap period is less than 1.0 second. In some examples, the overlap period is between 100 ms and 1.0 second. In at least one example, the overlap period is 500 ms.

Some embodiments illuminate and/or darken the optical module approximately instantaneously or as quickly as the electronics allow. In some embodiments, the optical module is illuminated or darkened over a fade period. The first optical module and second optical module may be concurrently illuminated for a fade period in a range having an upper value, a lower value, or upper and lower values including any of 100 ms, 200 ms, 300 ms, 400 ms, 500 ms, 750 ms, 1.0 seconds, or any values therebetween. For example, the fade period may be greater than 100 ms. In other examples, the fade period is less than 1.0 second. In some examples, the fade period is between 100 ms and 1.0 second. In at least one example, the fade period is 500 ms.

As described herein, the light source of the optical module may include a plurality of light sources, such as a LED array. The array of light sources can allow the optical module to be illuminated or darkened from a first side to a second side by illuminating or darkening the LEDs sequentially. In some embodiments, sequential darkening of illuminated LEDs in a first optical module in combination with sequential illumination of LEDs in a second optical module provides a slide effect and can provide the appearance of a logo or other illuminated symbol moving across the outer surface of the electronic device as the posture changes.

In at least some embodiments, systems and methods according to the present disclosure allow for the presentation of an illuminated optical module (e.g., logo or symbol) on an appropriate region of an electronic device as the posture of the electronic device changes.

The present disclosure relates to systems and methods for controlling the illumination and darkening of one or more optical modules on an outer surface of an electronic device according to at least the examples provided in the sections below:

1. A method of selectively illuminating part of an electronic device, the method comprising:
    obtaining a posture status of a hinge supporting a display cover relative to a base of the electronic device; and
    illuminating an optical module positioned on an outer surface of the electronic device based on a hinge position of the posture status.
2. The method of section 1, wherein the posture status is a laptop posture.
3. The method of section 1, wherein the posture status is a tablet posture.
4. The method of section 1, wherein the posture status is a studio posture.
5. The method of any preceding section, wherein obtaining the posture status includes receiving the rotational position of the hinge around a hinge axis.
6. The method of any preceding section, wherein obtaining the posture states includes receiving the rotational position of the hinge around a plurality of hinge axes.
7. The method of any preceding section, wherein obtaining the posture status includes receiving the orientation of the electronic device relative to a direction of gravity.
8. The method of any preceding section, wherein illuminating the optical module includes illuminating the optical module after a delay of at least 50 milliseconds after obtaining the posture status.
9. The method of any preceding section, wherein the optical module is a first optical module and wherein illuminating the first optical module includes darkening a second light, wherein the first optical module and second optical module are positioned in different locations on the electronic device.
10. The method of section 9, wherein the first optical module is on an outer surface of the display cover and the second optical module is on a support which supports the display cover.
11. The method of section 9, wherein the first optical module is on an outer surface of the display cover and the second optical module is on the base of the electronic device.
12. The method of section 9, wherein illuminating the first optical module includes illuminating the first optical module while darkening the second light.
13. The method of any of sections 9-12, wherein illuminating the first optical module includes illuminating the first optical module over a period of time at least 100 milliseconds.
14. The method of any preceding section, wherein obtaining the posture status includes receiving information from a Hall Effect sensor.
15. The method of any preceding section, wherein obtaining the posture status includes receiving information from an infrared optical sensor.
16. The method of any preceding section, wherein obtaining the posture status includes receiving information from a potentiometer.
17. The method of any preceding section, wherein obtaining the posture status includes receiving information from a bend sensor.
18. An electronic device comprising:
    a first portion;
    a second portion movably connected to the first portion by a hinge;
    an optical module positioned in an outer surface the first portion; and
    a sensor to measure a posture status of the first portion relative to the second portion;
    a cover material positioned over the optical module on the surface of the first portion wherein the cover material is continuous over a portion of the outer surface including the optical module; and
    a processor in data communication with the sensor and the optical module; and
    a hardware storage device in data communication with the processor, the hardware storage device having instruction stored thereon that, when executed by the processor, cause the processor to perform the method of any preceding claim.
19. The electronic device of section 18, wherein the cover material has a transmittance of at least 50%.
20. The electronic device of section 18 or 19, wherein the cover material is a metal with a plurality of holes therein.
21. The electronic device of section 18 or 19, wherein the cover material is a metal with a plurality of holes therein.
22. The electronic device of section 18 or 19, wherein the cover material is a textile.

23. The electronic device of section 18 or 19, wherein the cover material is a leather.
24. The electronic device of section 18 or 19, wherein the cover material is a polymer.
25. The electronic device of any of sections 18-24, wherein the cover material is transparent to radio frequency signals.
26. The electronic device of any of sections 18-25, wherein the optical module is not visible underneath the cover material when the optical module is not illuminated.
27. The electronic device of any of sections 18-26, wherein the optical module has a thickness less than 1.5 millimeters.
28. The electronic device of any of sections 18-27, wherein the cover material has a thickness less than 0.5 millimeters.
29. The electronic device of any of sections 18-28, wherein the optical module includes a plurality of lights.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of selectively illuminating part of an electronic device, the method comprising:
   obtaining a posture status of a hinge supporting a first portion of the electronic device including a display from a sensor measuring the posture status of the first portion relative to a second portion, a first portion optical module positioned on the first portion on an outer surface of the first portion on an opposite side from the display, the second portion including an outer surface of a base of the electronic device movably connected to the first portion by the hinge, a second portion optical module positioned on the outer surface of the base of the electronic device, the optical modules comprising an optical module positioned in an outer surface of the first portion;
   selecting one or more of the first portion optical modules and the second portion module positioned on an outer surface of the electronic device, based on the hinge position of the posture status; and
   illuminating the selected optical module.

2. The method of claim 1, wherein the posture status is a laptop posture.

3. The method of claim 1, wherein the posture status is a tablet posture or a studio posture.

4. The method of claim 1, wherein obtaining the posture status includes receiving the rotational position of the hinge around a hinge axis.

5. The method of claim 1, wherein obtaining the posture states includes receiving the rotational position of the hinge around a plurality of hinge axes.

6. The method of claim 1, wherein obtaining the posture status includes receiving the orientation of the electronic device relative to a direction of gravity.

7. The method of claim 1, wherein illuminating the selected optical module includes illuminating the optical module after a delay of at least 50 milliseconds after obtaining the posture status.

8. The method of claim 1, wherein the selected optical module is a first optical module and wherein illuminating the first optical module includes darkening a second light, wherein the first optical module and second optical module are positioned in different locations on the electronic device.

9. The method of claim 8, wherein the first optical module is on an outer surface of the display cover and the second optical module is on a support which supports the display cover.

10. The method of claim 8, wherein the first optical module is on an outer surface of the display cover and the second optical module is on the base of the electronic device.

11. The method of claim 8, wherein illuminating the first optical module includes illuminating the first optical module while darkening the second light.

12. The method of claim 8, wherein illuminating the first optical module includes illuminating the first optical module over a period of time at least 100 milliseconds.

13. The method of claim 1, further comprising a third portion connected to the second portion around a first hinge axis, wherein the third portion is connected to the first portion around a second hinge axis.

14. The method of claim 1, further comprising a third portion optical module positioned on the third portion.

15. The method of claim 14, wherein selecting one or more of the first portion optical module-and the second portion module positioned on an outer surface of the electronic device, includes selecting from the third portion optical module.

16. An electronic device comprising:
- a first portion including a display;
- a first portion optical module positioned on the first portion on an outer surface of the first portion on an opposite side from the display;
- a second portion including an outer surface of a base movably connected to the first portion by a hinge;
- a second portion optical modules positioned on the outer surface of the base of the electronic device, the optical modules comprising an optical module positioned in an outer surface of the first portion;
- a sensor to measure a posture status of the first portion relative to the second portion;
- a processor in data communication with the sensor and the optical module; and
- a hardware storage device in data communication with the processor.

17. The electronic device of claim 16, further comprising a cover material positioned over the first portion optical module on the outer surface of the first portion wherein the cover material is continuous over a portion of the outer surface including the first portion optical module.

18. The electronic device of claim 17, wherein the cover material has a transmittance of at least 50%.

19. The electronic device of claim 16, further comprising a third portion connected to the second portion around a first hinge axis, wherein the third portion is connected to the first portion around a second hinge axis.

20. The electronic device of claim 16, further comprising a third portion optical module positioned on the third portion.

* * * * *